(12) United States Patent
Tsao

(10) Patent No.: US 7,106,007 B2
(45) Date of Patent: Sep. 12, 2006

(54) FLASHLIGHT LAMP CIRCUIT WITH AUTOMATIC LIGHT ADJUSTMENT

(75) Inventor: Chung-Ming Tsao, Taipei (TW)

(73) Assignee: Inventec Multimedia & Telecom Corporation, Taipei (TW)

( * ) Notice: Subject to any disclaimer, the term of this patent is extended or adjusted under 35 U.S.C. 154(b) by 126 days.

(21) Appl. No.: 10/724,725

(22) Filed: Dec. 2, 2003

(65) Prior Publication Data

US 2005/0116660 A1 Jun. 2, 2005

(51) Int. Cl.
*H05B 37/00* (2006.01)

(52) U.S. Cl. .............................. 315/241 P; 315/200 A; 315/209 CD; 315/149; 315/291; 396/161; 396/167; 396/187

(58) Field of Classification Search ............ 315/241 P, 315/209 CD, 227 R, 237–240, 200 A, 224, 315/291, 307; 396/161, 166, 167, 180, 187, 396/201, 215, 251

See application file for complete search history.

(56) References Cited

U.S. PATENT DOCUMENTS

| | | | | | |
|---|---|---|---|---|---|
| 4,153,355 | A | * | 5/1979 | Ikawa et al. ................. | 396/177 |
| 4,363,542 | A | * | 12/1982 | Kondo et al. ................ | 396/160 |
| 4,457,601 | A | * | 7/1984 | Kondo et al. ................ | 396/167 |
| 4,469,989 | A | * | 9/1984 | Takematsu .............. | 315/241 P |
| 4,494,851 | A | * | 1/1985 | Maida et al. ................ | 396/163 |
| 5,384,611 | A | * | 1/1995 | Tsuji et al. .................... | 396/57 |

* cited by examiner

*Primary Examiner*—Haissa Philogene
(74) *Attorney, Agent, or Firm*—Rabin & Berdo, P.C.

(57) ABSTRACT

A flashlight lamp circuit with automatic light adjustment includes a flashlight charging unit for controlling charging of a main capacitor, a flashlight activation unit activating the flashlight lamp to project a flashlight on the photographed object according to a flashlight control signal, a light sensor receiving and converting a light from the photographed object into an electric signal, an integral circuit receiving the electric signal and having an adjustable circuit resistance. When the amount of flashlight reaches a required light exposure, the flashlight control unit extinguishes the flashlight lamp.

6 Claims, 6 Drawing Sheets

FLASHLIGHT LAMP CIRCUIT WITH AUTOMATIC LIGHT ADJUSTMENT

BACKGROUND OF THE INVENTION

1. Field of Invention

The present invention relates to a flashlight lamp circuit for cameras and, more particularly, a flashlight lamp circuit with automatic light adjustment functionality.

2. Related Art

The flashlight lamp is an essential component part of a conventional camera. Obtaining a correct light exposure usually requires knowing the distance of the object and the light sensitivity of the negative film and then evaluating the needed adequate diaphragm. The rear side of the flashlight lamp usually has a fast lookup table that provides the user with a selection of diaphragms. However, this conventional system is not very convenient, which motivates the development of flashlight lamp with automatic light adjustment.

A flashlight lamp with automatic light adjustment is usually provided with a control circuit and light sensor elements. As shown in FIG. 6, once the power source is turned on, a transistor V1 is used as switch to create intermittent pulses so that transformer T1 initially obtains an alternating voltage. Voltage increase is obtained via transformer T1, and it secondarily obtains an alternating voltage of about 60V. The alternating voltage is half commutated via diode D1 to become a direct voltage, which then charges main capacitor C2 and trigger capacitor C3. Once the flashlight lamp has been sufficiently charged, the synchronous light contact of the camera connects to the flashlight circuit. A conventional flashlight lamp circuit uses a transistor as switch controller of the charging current, and an RC circuit is used for the oscillation frequency loop. However, due to a relative high transistor-resistor-capacitor error value, the circuit stability is altered. In addition, the conventional flashlight adjustment circuit uses a Zener diode with an avalanche voltage of 270V to determine when charging stops. At this time, it is necessary to control transistor 2SC1623 to a conducting status, which then generates a high signal informing the CPU that there is voltage saturation. The CPU then outputs another signal to stop charging. Effective charging stop then is performed via transistor DTC143EK. The use of transistors as control means in association with a feedback loop therefore creates a relatively high error value, which may induce erroneous actions. Furthermore, the VR variation range is excessively large, which renders difficult initial settings of the automatic light adjustment.

SUMMARY OF THE INVENTION

It is therefore an objective of the invention to provide a flashlight lamp circuit with automatic light adjustment that overcomes the problems of the prior art and allows easy initial settings of the light adjustment, reduces the control error of the charging current, and thereby improves the circuit stability.

To achieve the above and other objectives, a flashlight lamp circuit with automatic light adjustment of the invention comprises a flashlight lamp charging circuit, a flashlight activation unit, a flashlight lamp, a light sensor, an integral circuit, and a flashlight control unit. The flashlight lamp charging circuit controls charging of a main capacitor, and determines the start and stop of charging according to a voltage level of the main capacitor so that the main capacitor is in a workable status. The flashlight activation unit receives a flashlight activation signal from a user when the main capacitor is in a workable status, and executes flashlight activation according to the flashlight activation signal. The flashlight lamp emits a flashlight on a photographed object according to the flashlight activation signal. The light sensor receives and converts a light from the photographed object into a first electric signal. The integral circuit receives the first electric signal from the light sensor and outputs a second electric signal proportional to the amount of flashlight, wherein the integral circuit includes a light adjusting resistor for adjusting the resistance and output of the integral circuit. The flashlight control unit receives the second electric signal from the integral circuit, wherein the flashlight control unit extinguishes the flashlight lamp when an amount of light corresponding to the level of the second electric signal reaches a required light exposure.

According to the flashlight lamp circuit of the invention, a DC converter integrated circuit is used to control the activation of the flashlight lamp so that the error value is reduced and the circuit stability is improved. Associating an accurate voltage division with the integrated circuit for achieving voltage feedback allows obtaining a circuitry globally more stable and more precise in activation. Furthermore, the adjustment of the light-adjusting resistor in the integral circuit allows more easily adjusting the initial settings of the light adjustment and consequently a more precise light adjustment.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
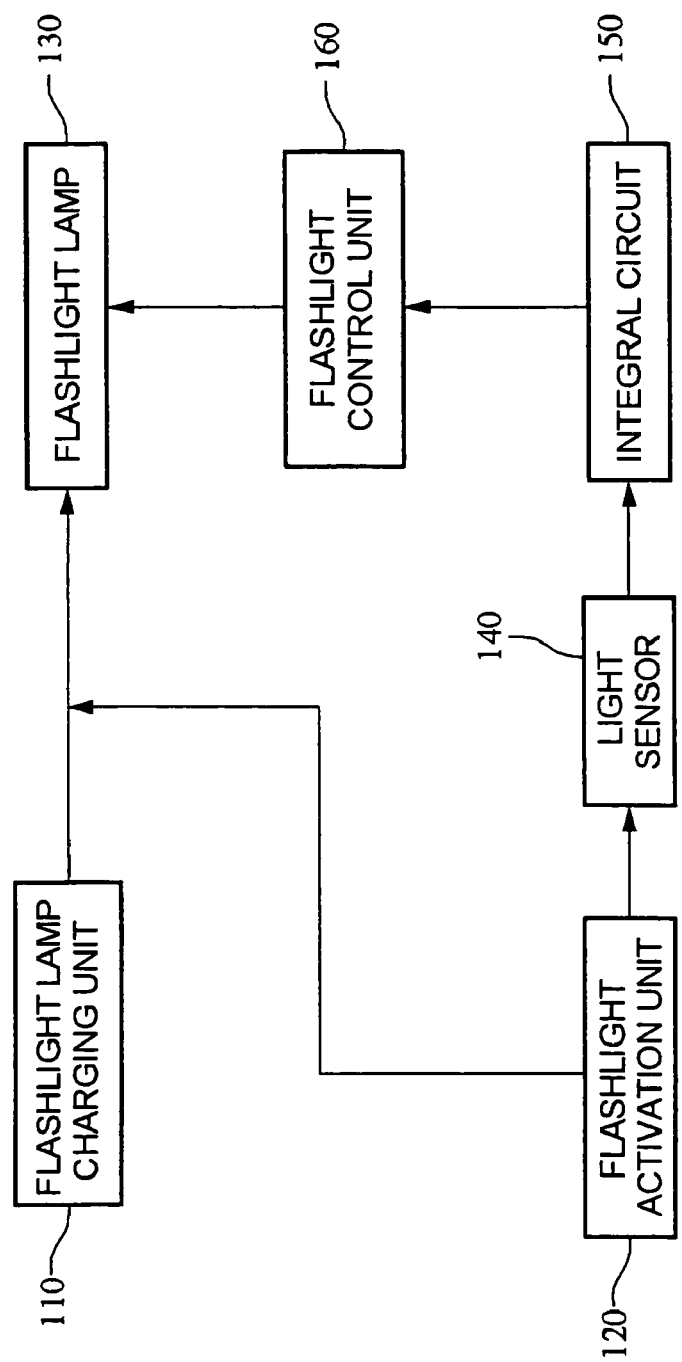
FIG. 1 is a block diagram of a flashlight lamp circuit with automatic light adjustment according to an embodiment of the invention.

FIG. 1 is a block diagram of a flashlight lamp circuit with automatic light adjustment according to an embodiment of the invention. The flashlight lamp circuit includes the following elements.

A flashlight lamp charging unit 110 controls charging of a main capacitor. A voltage level of the main capacitor determines whether charging starts or stops, so that the main capacitor is permanently in a workable status. If the voltage of the main capacitor is lower than 270V charging starts; and if it reaches 300V, charging stops.

A flashlight activation unit 120 receives a flashlight control signal from the user, and activates flashlight according to the flashlight control signal. The flashlight activation unit 120 includes a DC converter integrated circuit having a Darlington circuit for emitting a flashlight control signal. The electric current of the Darlington circuit controls the capacitor charging speed. A resistor is used to control the electric current of the Darlington circuit, and a fast switch diode is further incorporated to adjust the oscillation frequency.

A flashlight lamp 130 emits flashlight onto the photographed object.

A light sensor 140 receives light from the photographed object, and converts it to an electric signal.

An integral circuit 150 receives the electric signal from the light sensor 140, and delivers an electric signal directly proportional to the light amount of the flashlight. The integral circuit 150 includes a light adjusting resistor for adjusting the resistance of the integral circuit and, accordingly, the output of the integral circuit.

A flashlight control unit 160 receives an electric signal from the integral circuit 150. If the received electric signal corresponds to a flashlight amount, which reaches a required exposure, the flashlight lamp is extinguished.

Figure 2:
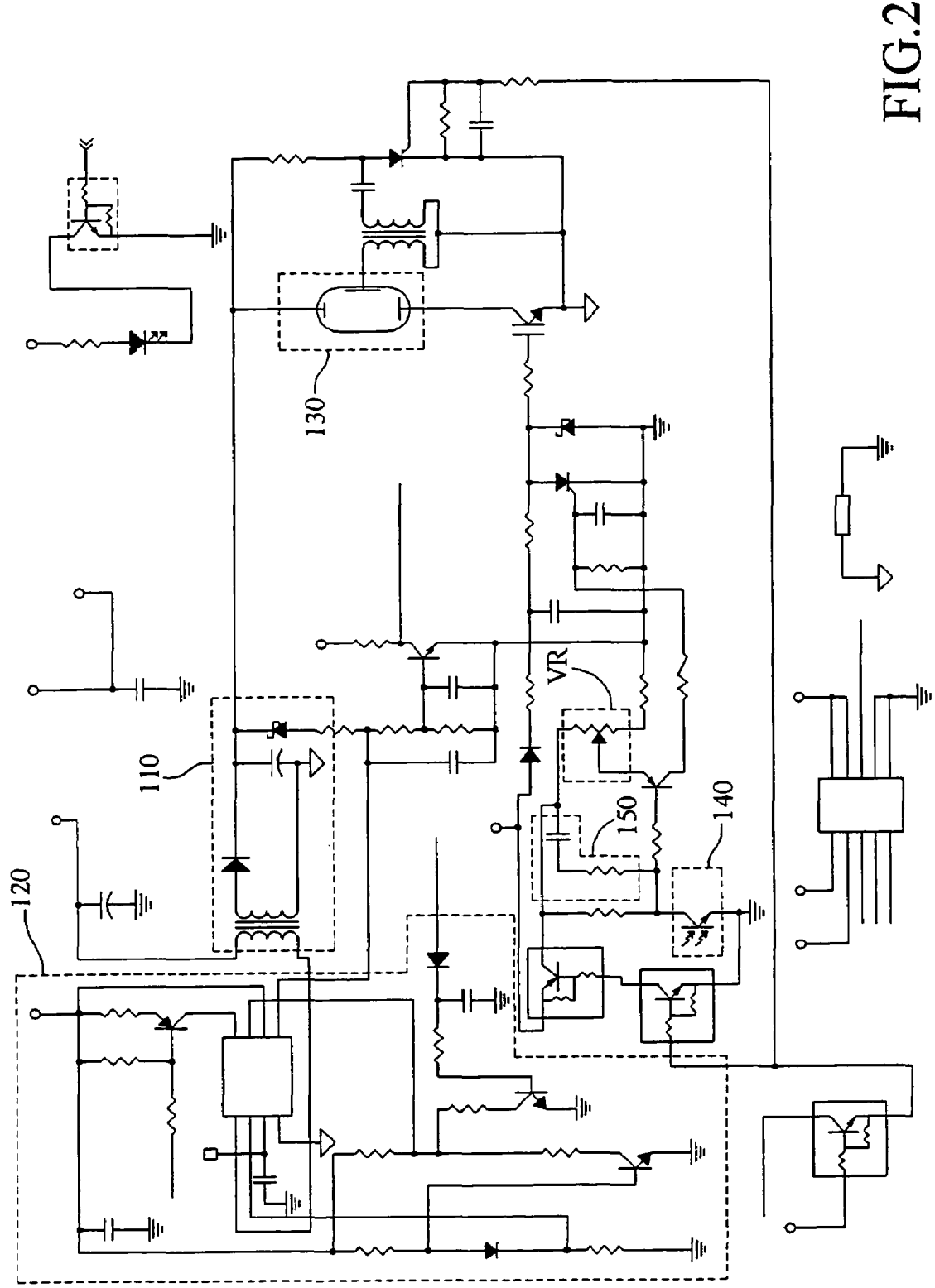
FIG. 2 is a schematic view of a circuit implementation of the flashlight lamp circuit according to an embodiment of the invention.

FIG. 2 is a circuit diagram of an embodiment of the invention. After the flashlight lamp has been charged, the flashlight synchronous contact of the camera connects to the flashlight circuit. During the light emission time interval, light from the flashlight lamp irradiates on a photographed object and then travels back to the camera (exposure) and the light sensor element. This light sensor converts the received light into an electric signal, which is inputted to the integral circuit. The integral circuit then delivers an electric signal directly proportional to the flashlight amount. When the flashlight amount has reached a required level of light exposure, the integral circuit outputs an electric signal to the control circuit that triggers the flashlight stopper circuit to extinguish the flashlight. Because the sustained flashlight duration is very short and in the meantime needs light adjustment, the light sensor therefore has to be a fast-reaction photosensitive element.

Figure 3:
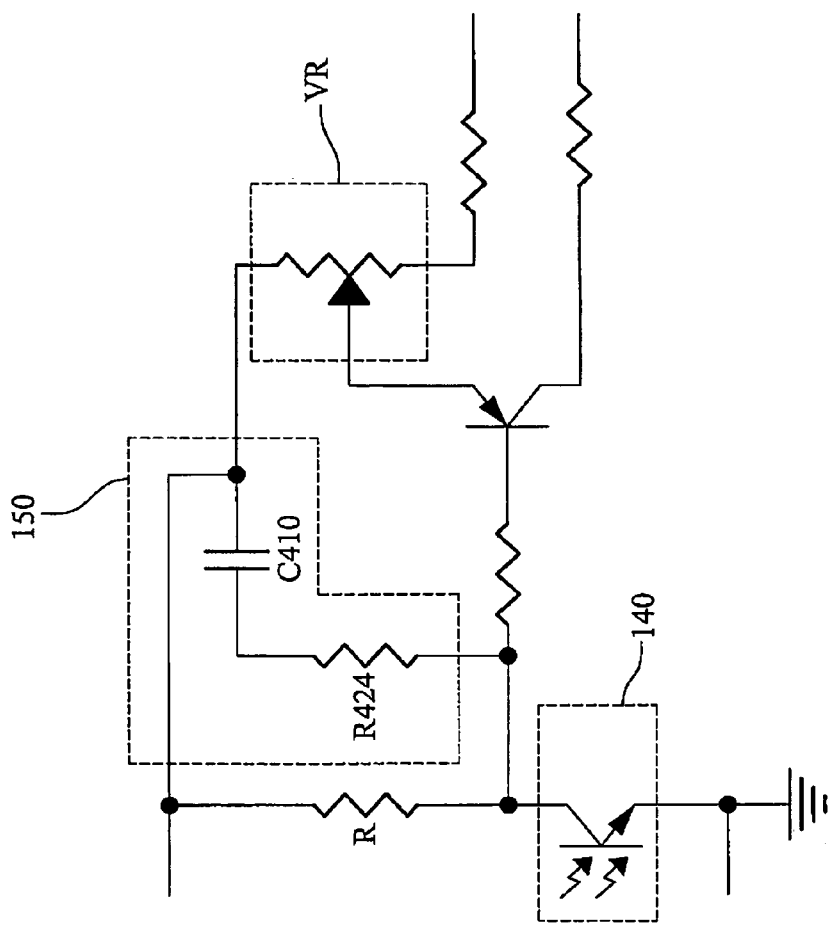
FIG. 3 is schematic view of a light adjusting circuit according to an embodiment of the invention.

Referring to FIG. 3, because diverse main capacitors may be chosen, the resistance of the RC integral circuit needs adjustment. Capacitor C410 has a range between 0.47μF and 0.1μF, resistor R424 has a range between 1K and 200, but light adjusting variable resistor VR of the SMT is relatively more difficult to adjust, due to a different circumference. If resistor VR uses a too small value, the electric current will increase and will easily deform the curvature. An end of the variable resistor VR therefore connects to a resistor, so that VR adjustment is not excessively sensitive. For example, if the variable resistor VR is 10 Kilo-ohms, the variation may be within a range of 1 Kilo-ohms, which shows relative sensitivity; if VR is 2 Kilo-ohms, the variation is within a range 200 ohms of lesser sensitivity. Therefore, an embodiment of the invention uses a the variable resistor VR of 2 Kilo-ohms serially connected to a resistor of 8.2 Kilo-ohms. These initial settings of the automatic flashlight allow easier and more accurate adjustment.

Figure 4:
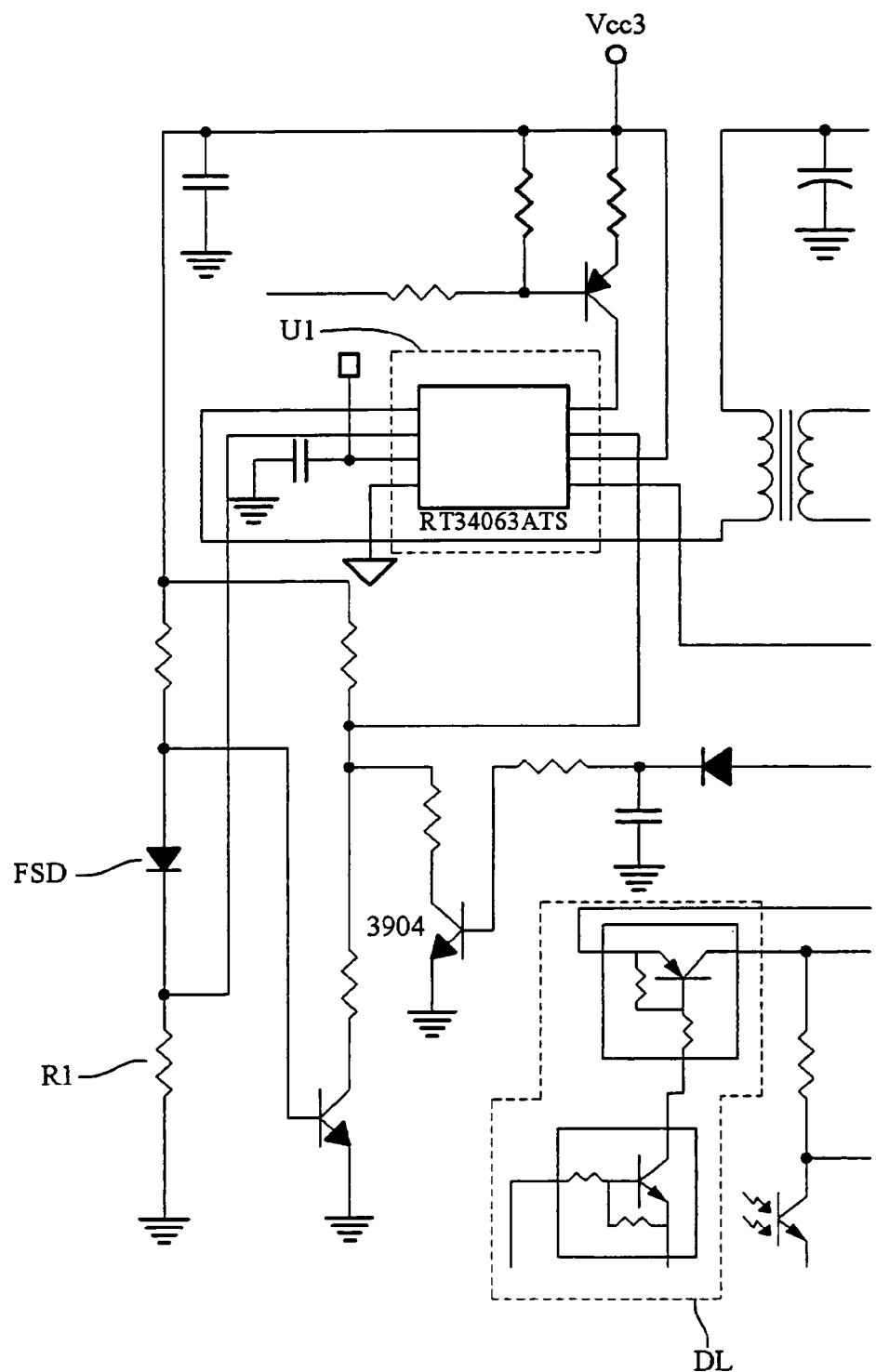
FIG. 4 is a schematic view of a flashlight activation circuit according to an embodiment of the invention.

A conventional flashlight control circuit uses transistors to control charging and cutoff after full charging. In contrast, the present invention uses an IC converter U1. FIG. 4 shows a DC/DC converter, using the electric current of a Darlington circuit DL to control the capacitor charging speed. A 0.11-ohms resistor R1 is used to limit the electric current of the Darlington circuit DL. A fast switch diode FSD and 3904 are associated to control the voltage (from VCC3 voltage divider) fed back to the IC U1 and regulate the oscillation frequency of the DC converter.

Figure 5:
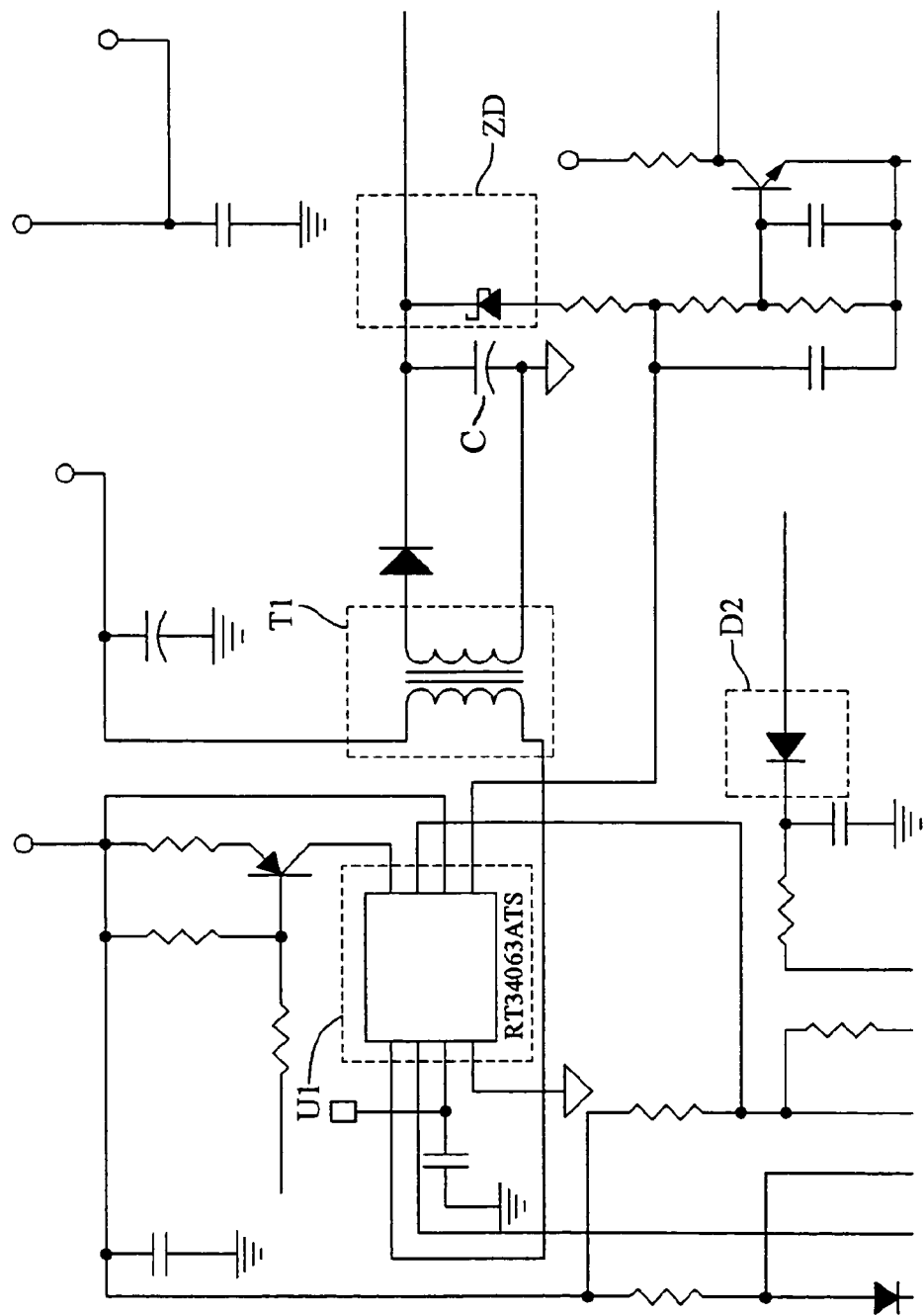
FIG. 5 is a schematic view of an oscillation voltage increasing circuit according to an embodiment of the invention.
Figure 6:
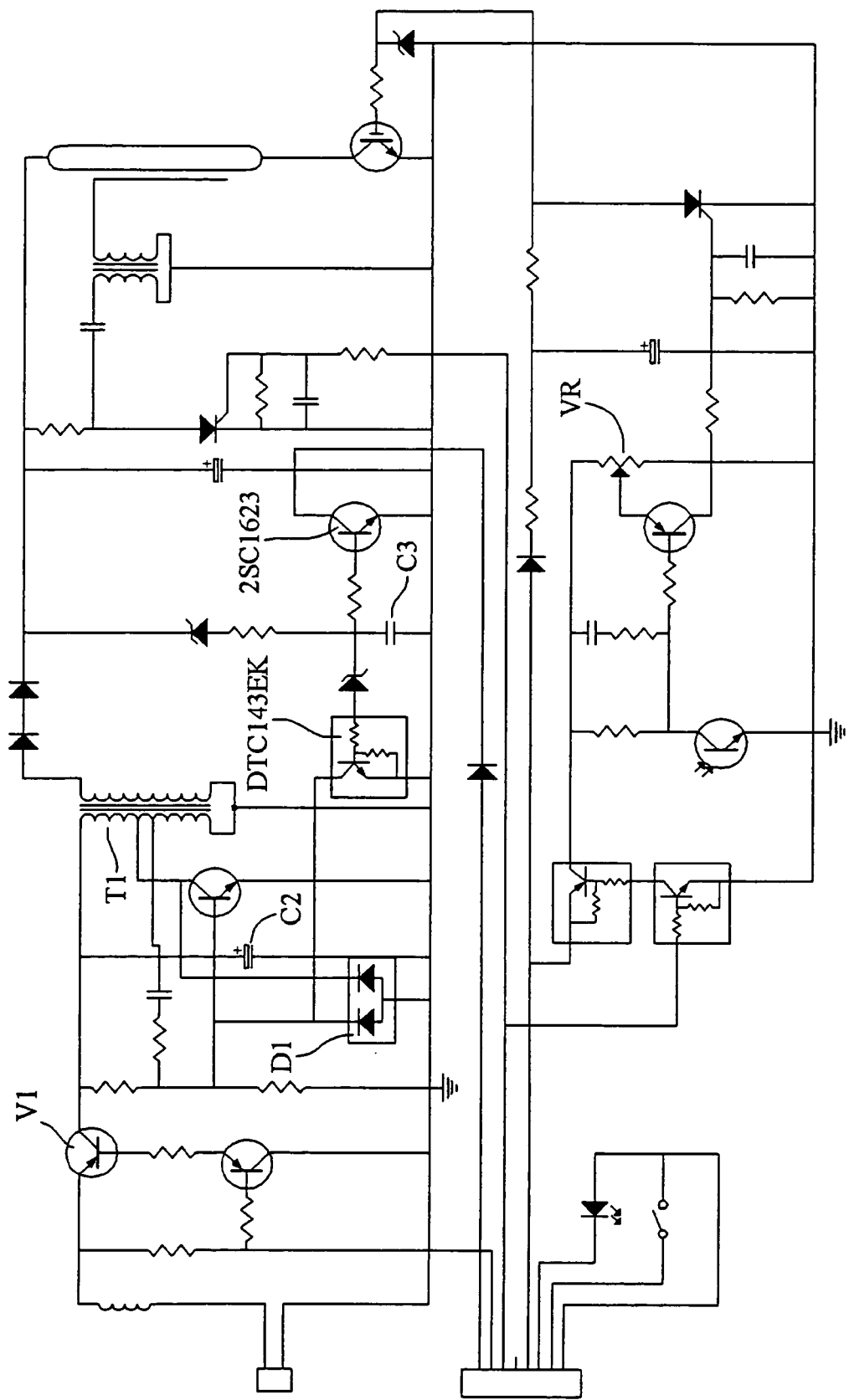
FIG. 6 is a block diagram of a flashlight lamp circuit with automatic light adjustment according to the prior art.

Referring FIG. 5, the Darlington circuit of the IC is used to provide a sufficiently high electric current, which passes through a voltage transformer to obtain an increased voltage. The DC converter generates an alternating pulse width modulation signal that becomes via a voltage transformer T1 an alternating signal with increased voltage, undergoes commutation via the diode, to charge the main capacitor C. Once the charging voltage has reached 300V, the evaluation for stopping charging is made via a Zener diode ZD with an avalanche voltage of 270V. Avalanche effects occur at 270V, which results in a voltage stabilization around 300V. At this point, two locations have to be controlled. First, a voltage division fed back to a reference regulator of the IC has to be around 1.25V to stop charging. Second, a second voltage division controller 3904 emits a Strobe_Ready signal (originally high voltage, after Ready turn to a low voltage) to the CPU. Associating an accurate voltage division with the IC for achieving voltage feedback allows obtaining a circuit globally more stable and more precise in activation.

It will be apparent to the person skilled in the art that the invention as described above may be varied in many ways, and notwithstanding remaining within the spirit and scope of the invention as defined in the following claims.

What is claimed is:

1. A flashlight lamp circuit with automatic light adjustment, comprising:
   a flashlight lamp charging circuit, controlling charging of a main capacitor, and determining start and stop of charging according to a voltage level of the main capacitor so that the main capacitor is in a workable status;
   a flashlight activation unit, receiving a flashlight activation signal when the main capacitor is in a workable status, and executing flashlight activation according to the flashlight activation signal;
   a flashlight lamp, emitting a flashlight on a photographed object according to the flashlight activation signal;
   a light sensor, receiving and converting a light from the photographed object into a first electric signal;
   an integral circuit, receiving the first electric signal from the light sensor and outputting a second electric signal proportional to the amount of flashlight, wherein the integral circuit includes a light adjusting resistor for adjusting the resistance and output of the integral circuit; and
   a flashlight control unit, receiving the second electric signal from the integral circuit, wherein the flashlight control unit extinguishes the flashlight lamp when an amount of light corresponding to the level of the second electric signal reaches a required light exposure.

2. The circuit according to claim 1, wherein a range of the workable status is between 270V~300V.

3. The circuit according to claim 1, wherein the flashlight activation unit is a DC converter.

4. The circuit according to claim 3, wherein the DC converter includes a Darlington circuit, and an electric current of the Darlington circuit controls the capacitor charging speed.

5. The circuit according to claim 4, wherein the electric current of the Darlington circuit is controlled by means of a resistor.

6. The circuit according to claim 1, wherein the flashlight activation unit further includes a fast switch diode.

* * * * *